United States Patent
Levi et al.

(10) Patent No.: US 6,583,961 B2
(45) Date of Patent: *Jun. 24, 2003

(54) AIR BEARING FACILITATING LOAD/UNLOAD OF A MAGNETIC READ/WRITE HEAD

(75) Inventors: Pablo G. Levi, Sunnyvale, CA (US); Manuel Anaya-Dufresne, Fremont, CA (US); Wuxing Gan, Fremont, CA (US); Jesse Jianxian Dong, Fremont, CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/957,297

(22) Filed: Sep. 19, 2001

(65) Prior Publication Data

US 2002/0018320 A1 Feb. 14, 2002

Related U.S. Application Data (63) Continuation of application No. 09/410,107, filed on Sep. 30, 1999, now Pat. No. 6,356,412.

(51) Int. Cl.$^7$ ................................................. G11B 5/60
(52) U.S. Cl. ..................................... 360/236.8; 360/237
(58) Field of Search ............................... 360/235.4–237

(56) References Cited

U.S. PATENT DOCUMENTS

| | | | |
|---|---|---|---|
| 4,218,715 A | 8/1980 | Garnier | |
| 5,285,337 A | 2/1994 | Best et al. | |
| 5,359,480 A | 10/1994 | Nepela et al. | |
| 5,442,850 A | 8/1995 | Kerth | |
| 5,473,485 A | 12/1995 | Leung et al. | |
| 5,568,981 A | 10/1996 | Nepela et al. | |
| 5,610,784 A | 3/1997 | Dorius et al. | |
| 5,685,645 A | 11/1997 | Nepela et al. | |
| 5,754,367 A | 5/1998 | Chang et al. | |
| 5,796,551 A | 8/1998 | Samuelson | |
| 5,831,791 A * | 11/1998 | Chhabra | 360/236.1 |
| 5,872,685 A | 2/1999 | Park et al. | |
| 5,889,634 A | 3/1999 | Chang et al. | |
| 5,889,637 A | 3/1999 | Chang et al. | |
| 5,914,833 A * | 6/1999 | Yotsuya et al. | 360/235.5 |
| 5,917,679 A | 6/1999 | Park et al. | |
| 5,940,249 A * | 8/1999 | Hendriks | 360/235.6 |
| 5,953,181 A | 9/1999 | Utsunomiya | |
| 5,973,880 A * | 10/1999 | Hashimoto et al. | 360/236.2 |
| 5,982,582 A | 11/1999 | Ye et al. | |
| 6,021,024 A | 2/2000 | Akiyama et al. | |
| 6,055,128 A | 4/2000 | Dorius et al. | |
| 6,057,983 A | 5/2000 | Kajitani | |
| 6,069,770 A | 5/2000 | Cui et al. | |
| 6,072,662 A | 6/2000 | Utsunomiya | |
| 6,137,656 A | 10/2000 | Levi et al. | |
| 6,144,528 A | 11/2000 | Anaya-Dufresne et al. | |
| 6,144,529 A | 11/2000 | Wada et al. | |
| 6,212,042 B1 | 4/2001 | Gui et al. | |
| 6,215,621 B1 * | 4/2001 | Boutaghou | 360/236.6 |
| 6,236,543 B1 * | 5/2001 | Han et al. | 360/236.6 |
| 6,333,835 B1 * | 12/2001 | Kang et al. | 360/235.4 |
| 6,356,412 B1 * | 3/2002 | Levi et al. | 360/236.6 |
| 6,359,754 B1 * | 3/2002 | Riddering et al. | 360/235.2 |
| 6,373,661 B1 * | 4/2002 | Tokuyama et al. | 360/236.6 |

FOREIGN PATENT DOCUMENTS

| | | | |
|---|---|---|---|
| JP | 10-283745 | * | 10/1998 |
| WO | WO 96/27876 | * | 9/1996 |

* cited by examiner

Primary Examiner—William Klimowicz
(74) Attorney, Agent, or Firm—Carr & Ferrell LLP (57) ABSTRACT

An air bearing surface for use on a magnetic read/write head. The air bearing surface provides a stable flight profile while exhibiting exception load/unload characteristics through the use of a plurality of pads providing high pressure areas as well as a central cavity providing a sub-ambient pressure to counter the high pressure areas. The channel is set a predetermined distance from the leading edge of the air bearing, the predetermined distance being greater than with prior art designs. A channel extends from the leading edge to the cavity to allow airflow into the cavity. The channel and the set back of the cavity both act in conjunction to facilitate unloading of the air bearing by preventing excessive sub ambient pressures.

30 Claims, 13 Drawing Sheets

AIR BEARING FACILITATING LOAD/UNLOAD OF A MAGNETIC READ/WRITE HEAD

This application is a continuation of U.S. patent application Ser. No. 09/410,107 filed on Sep. 30, 1999, now U.S. Pat. No. 6,356,412, issued on Mar. 12, 2002, and claims priority therefrom pursuant to 35 U.S.C. § 120.

BACKGROUND OF THE INVENTION

1. Field of the Invention

The present invention relates generally to air bearing sliders for use in magnetic head assemblies and in particular to air bearing slider geometry.

2. Background of the Invention

Figure 1A:
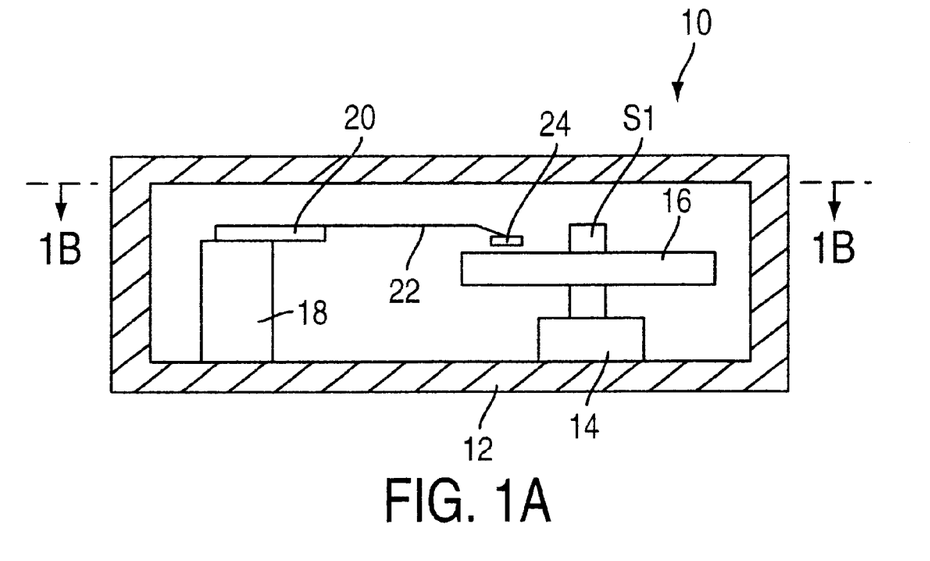
FIG. 1A is a partial cross-sectional front elevation view of a magnetic data storage system.
Figure 1B:
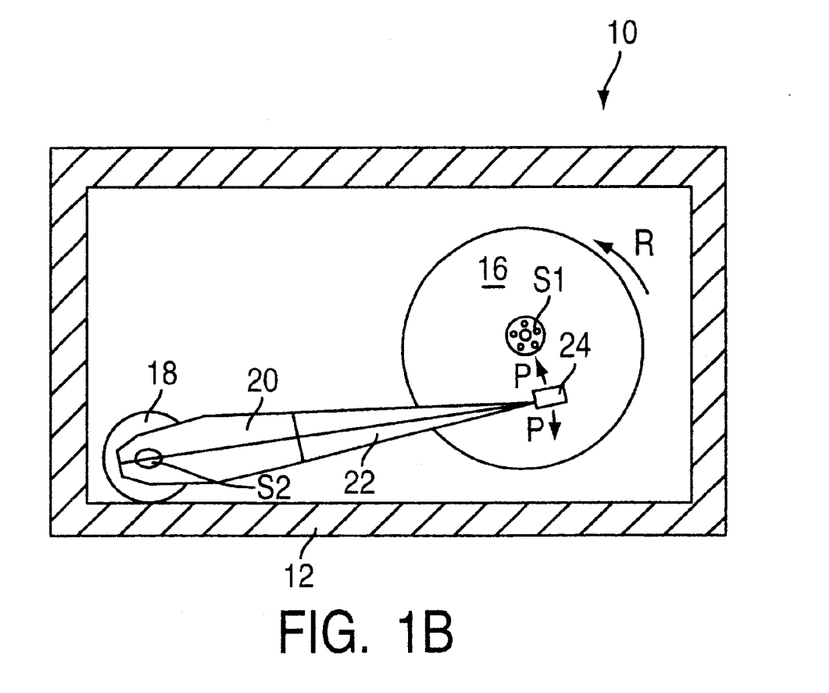
FIG. 1B is a top plan view taken along line 1B—1B of FIG. 1A.

Magnetic disk drives are used to store and retrieve data for digital electronic apparatuses such as computers. In FIGS. 1A and 1B, a magnetic disk data storage systems 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 (which will be described in greater detail with reference to FIG. 2A) typically includes an inductive write element with a sensor read element. As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads," ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

Figure 2:
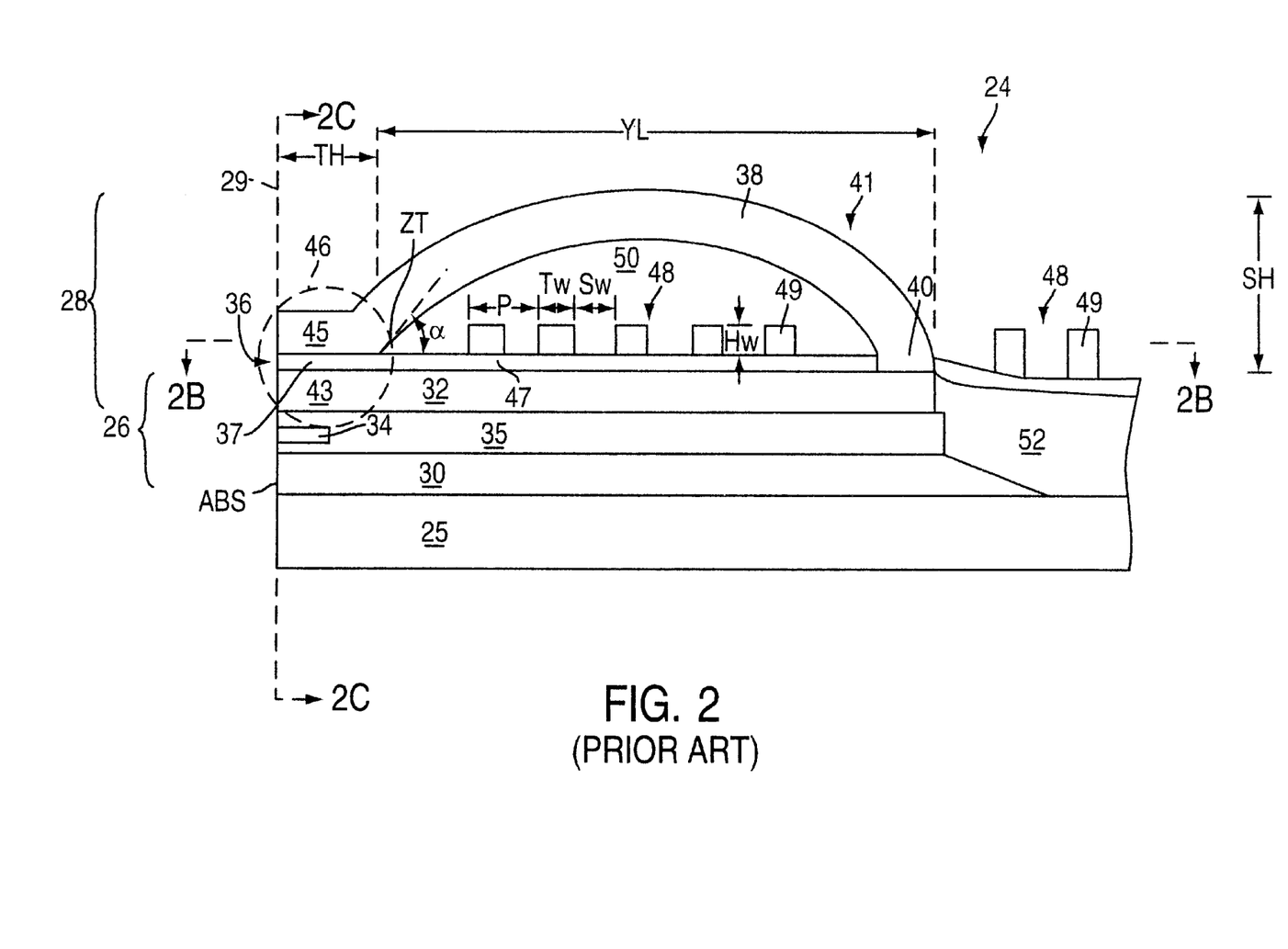
FIG. 2 is a cross-sectional view of a read write head of the disk drive assembly of FIGS. 1A and 1B.

FIG. 2 depicts a magnetic read/write head 24 including a substrate 25 above which a read element 26 and a write element 28 are disposed. Edges of the read element 26 and write element 28 also define an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor which is used to detect magnetic field signals from a magnetic medium through changing resistance in the read sensor.

In magnetic disk technologies, it is generally desired to achieve higher data recording densities. In the context of the air bearing slider, one way of achieving increased recording densities is by maintaining a low flying height. Maintaining a low flying height requires that, pitch angle and roll angle be held constant over the whole disk surface.

On the one hand, the read/write head 24 must fly at a sufficient height to avoid frictionally related problems caused by physical contact during data communication between the head 24 and the rapidly rotating disk 16. On the other hand, the head 24 should be made to fly as low as possible to obtain the highest possible recording densities. Accordingly, it is preferred that the slider fly as close as possible to the disk surface without actually contacting the disk surface. A constant flying height is preferably maintained, regardless of variations in tangential velocity of the disk 16 during flying, cross movements of the head 24 during data search operations, and changes in skew angle in the case of rotary type actuators.

Figure 3A:
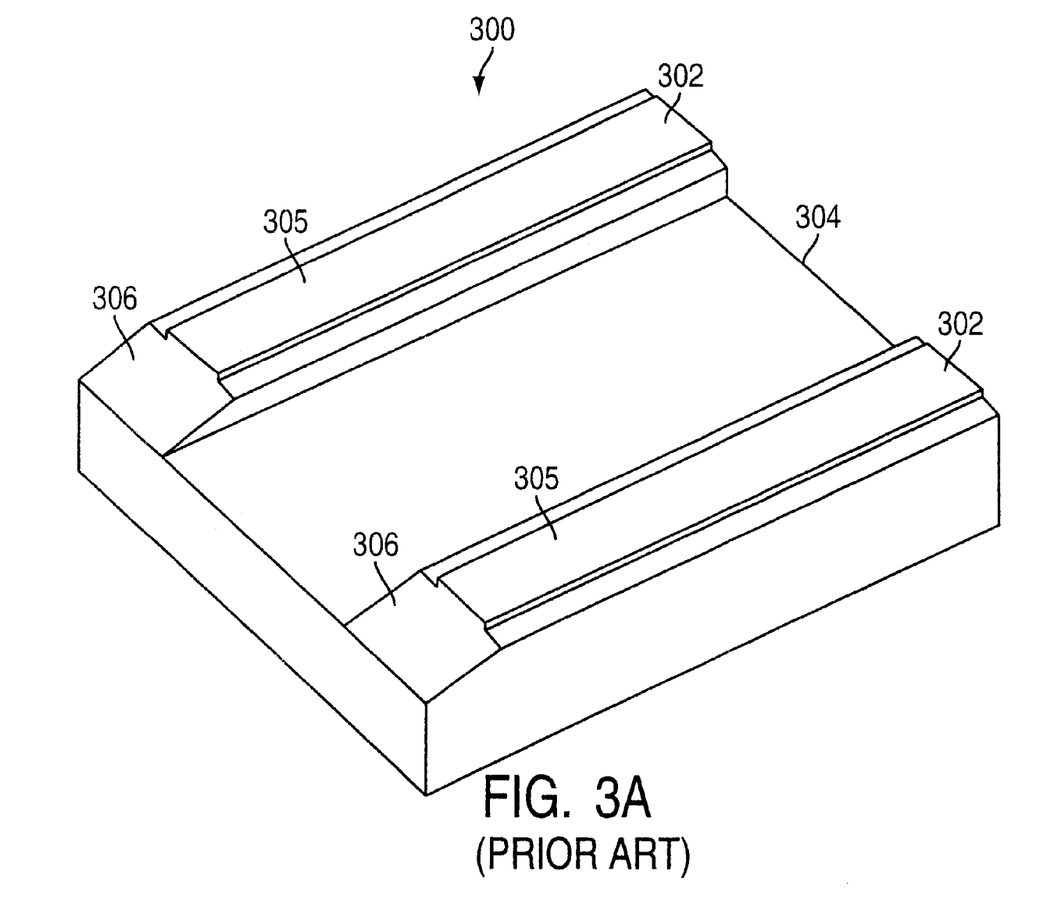
FIG. 3A is a perspective view of a prior art air bearing of a read write head.

FIG. 3A is a schematic perspective view of a conventional tapered flat slider 300. Two rails 302 are formed in parallel at a predetermined height on a surface of a slim hexahedron body 304 to thus form lengthwise extending air bearing surface rails (ABS rails) 305. A tapered or sloped portion 306 is formed at each leading edge portion of the ABS rails 305. In such a structure, air within a very thin boundary layer rotates together with the rotation of the disk due to surface friction. When passing between the rotating disk and the slider, the air is compressed by the sloped portion 306 on the leading edge of the ABS rails 305. This pressure creates a hydrodynamic lifting force at the ramp section which is sustained through the trailing edge of the ABS, thus allowing the slider to fly without contacting the disk surface.

Figure 3B:
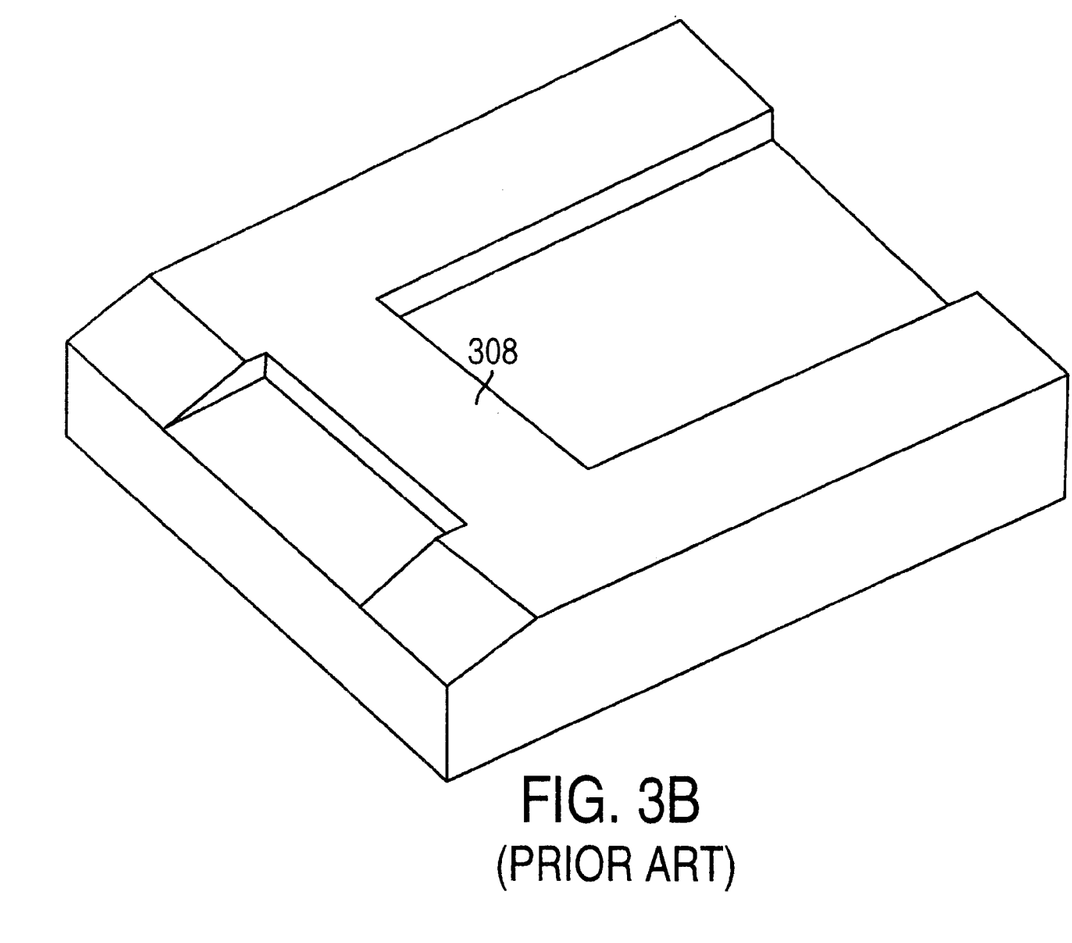
FIG. 3B is a perspective view of a prior art air bearing of a read write head.

The conventional slider of this type suffers a drawback in that the flying height, pitch angle and roll angle vary considerably according to the skew angle of the rotary type actuator, i.e. according to the radial position of the slider over the disk surface. In addition, rapid movement of the actuator arm 20 can cause variations in slider pitch. With reference to FIG. 3B, in order to overcome these variations in slider pitch and to ensure a stable and low level fly height, prior art ABSs have been provided with a cross rail 308, oriented perpendicular to the direction of airflow and located toward the leading edge of the slider. Such a cross rail serves to create a negative or sub-ambient pressure there behind which forces the slider downward. Ideally the downward pressure from the cross bar balances with the upward forces under the rails and a stable fly height is achieved.

Figure 3C:
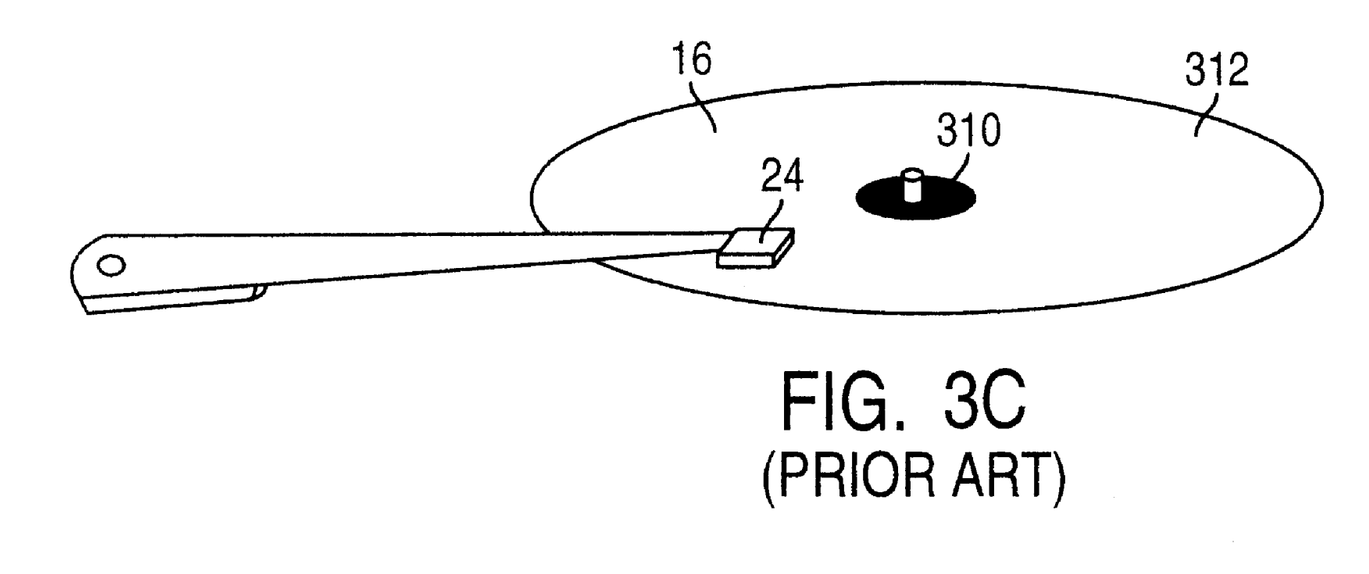
FIG. 3C is a perspective view of a contact start stop magnetic data storage system

When the time comes to terminate use of the data storage system 10 the head 24 must be stored. One prior method referred to in FIG. 3C is known to those skilled in the art as contact start stop (CSS). With the CSS system, upon powering down the system 10, the head 24 lands upon the disk 16. The disk of this system is provided with a landing zone 310. The surface of the landing zone has small bumps, formed with a laser, which prevent the head from sticking to the surface of the disk. The remainder of the disk provides a data zone 312 on which data can be recorded or read. Since any area consumed by the landing zone detracts from available data zone area, in order to increase the total amount of data which can be stored on the disk 16 it is desirable to reduce or eliminate the landing zone 310 in order to increase the data zone.

Figure 3D:
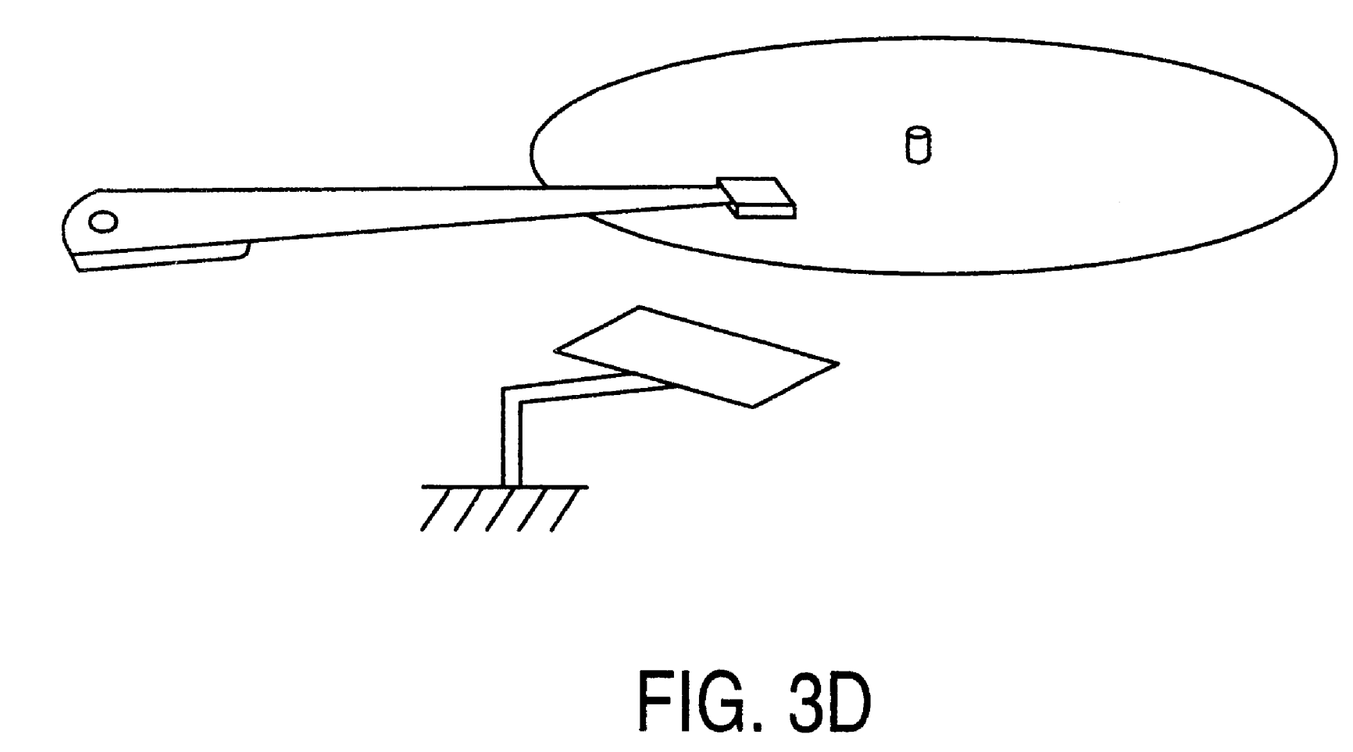
FIG. 3D is a perspective view of a load/unload magnetic data storage system.

With reference to FIG. 3D, one method for eliminating the need for a landing zone 310, is called a load/unload system. A landing ramp 314 is provided on which the suspension arm 22 can rest allowing the head 24 to suspend in mid air during non-use. This method advantageously protects the head 24 and recording medium 16 by eliminating the need to contact the head with the medium. However, this method creates other problems in that during unload of the head 24 from the recording medium 16 the sub-ambient pressure tends to resist unloading of the head.

As the head 24 is lifted from the recording medium 16, the high pressure and sub-ambient pressure under the air bearing surface both decrease. However, prior art air bearing designs exhibit an unequal reduction of the pressures as the head 24 is unloaded. The sub-ambient pressures tend to decrease at a significantly lower rate than the high pressures as the distance between the head 24 and the recording medium 16 increases. This creates a net sub-ambient force during unload. In some cases the sub ambient force can be sufficient to cause plastic deformation of the head suspension 22, permanently damaging the system 10, and can cause dimpling of the recording medium 16. Furthermore, the excessive sub-ambient pressure can cause a spring back effect when the sub-ambient pressure is finally overcome, causing the head 24 to severely impact the recording medium 16 damaging both the recording medium and the head.

Thus there remains a need for an ABS having exceptional flight profile characteristics which also exhibit good load and unload characteristics. Such a head would not experience excessive sub-ambient pressures during unload and would preferably be useable in either CSS or load/unload systems.

SUMMARY OF THE INVENTION

The present invention provides an air bearing surface (ABS) for use with a magnetic read/write head. The air bearing surface includes a pair of side rails defining there between a channel. The channel terminates at its back end in a cavity also defined between the side rails, and a pressure pad is provided adjacent the trailing edge of the ABS. The cavity of air bearing surface is set at a predetermined distance from the leading edge of the air bearing, the predetermined distance being greater than found in prior art air bearings. The channel and the cavity location both act to reduce sub-ambient pressure experienced under the air bearing during unload of the read/write head.

A pair of front pads are provided located near the front of each side rail. The pressure pads provide lift and also control the pitch of the ABS. In addition, a pair of central pads provided on the side rails midway between the front and rear ends, provide additional lift and help to control pitch and roll of the ABS. The side rails terminate in a pair of rear pads, one on each side rail, which are separated from the central pads by a gap. The rear pads, like the central pads, help to control pitch and roll, to provide a stable flight profile, and the gap allows air to flow there through which facilitates stable flight when the head is flying at a skewed angle.

The trailing edge pad is the location of highest pressure under the air bearing and provides most of the lift. The trailing edge pad includes a step which helps to increase the pressure thereunder. The step can terminate at its trailing edge in either an abrupt edge or a smooth ramp.

An alternate embodiment of the ABS has the front and central pads connected by a bridge. Such a bridge is useful in circumstances where increased pitch is desired. In yet another embodiment, the depth of the cavity can be increased in order to provide additional sub-ambient pressure when necessitated by design parameters such as a need for a lower flying height.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

Figure 4:
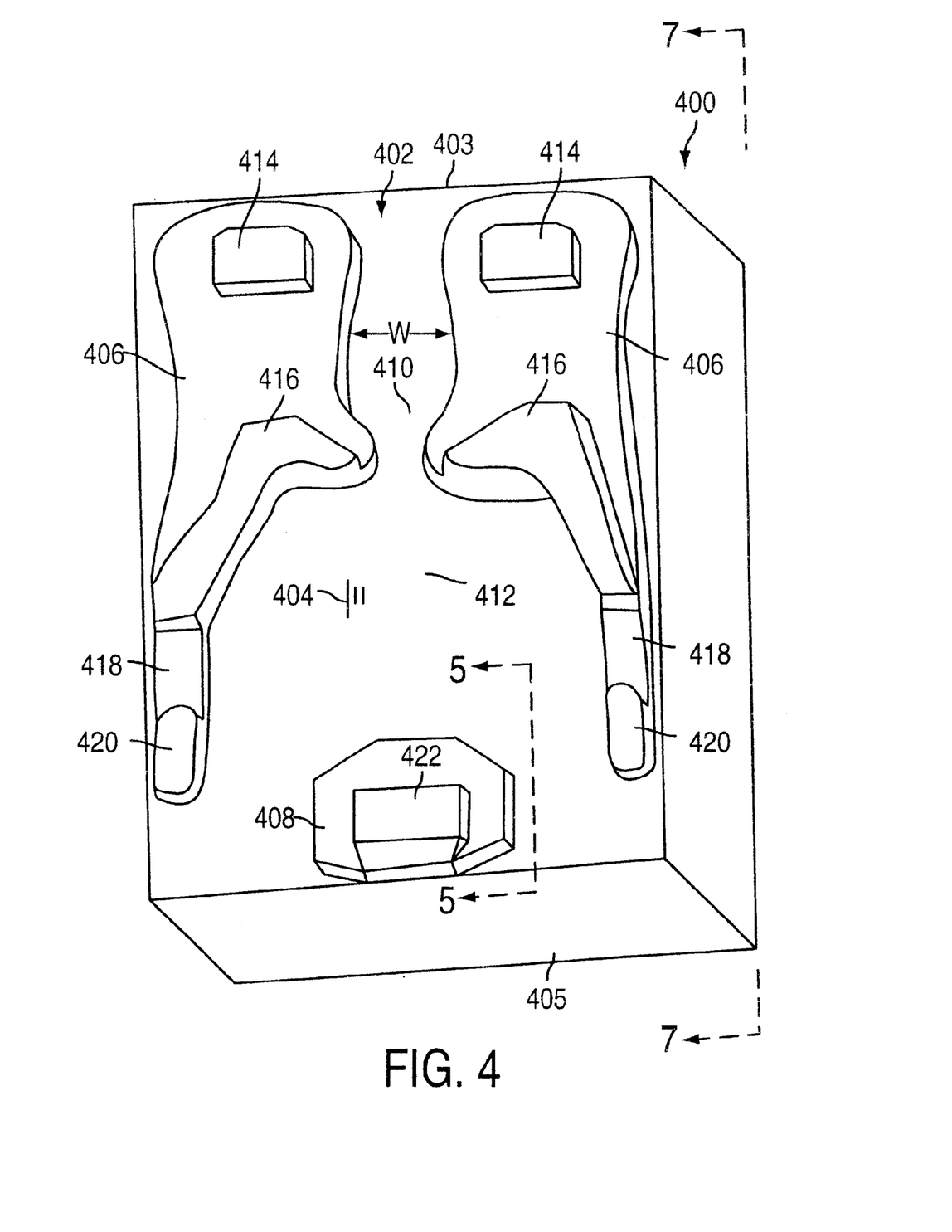
FIG. 4 is a perspective view of an air bearing of the present invention.

With reference to FIG. 4, a preferred embodiment of the present invention is embodied in a read/write head 400 in the form of a generally rectangular ceramic block having a surface thereof configured as an air bearing surface (ABS) generally referred to as 402, having a leading edge 403 at its front end and a trailing or edge 405 at its rear end. Description of the ABS can be best facilitated with reference to a base elevation 404 from which various features protrude. The ABS 402 is provided with a pair of side rails 406 and a trailing edge pad 408.

The side rails 406 define there between a channel 410 at the portion of the rails nearest the leading edge 403. The channel has a width W, which can be constant or variable along its length, the channel of the preferred embodiment being variable along its length. Midway along the length of the side rails the channel 410 terminates opening to form a cavity 412 between the side rails. The cavity is formed by a significant narrowing of each side rail 406 as the side rails follow the edges of the ABS toward their rear ends. The side rails 406 create a high pressure area and are critical for providing a stable ABS 402. There must be sufficient surface area of the center rails to allow the air bearing to fly. Furthermore, increasing the surface area of the side rails 406 will increase the fly height of the ABS 402.

The cavity provides a sub ambient pressure under the ABS 402 during operation of the system 10. The sub ambient pressure keeps the ABS in close proximity to the magnetic medium 16 during operation of the disk drive and helps to maintain a stable fly height. However, as discussed previously in the background of the invention, an excessive sub ambient pressure can cause problems during unload. A feature of the preferred embodiment of the invention is that the cavity 412 is located further from the leading edge than with prior art designs. This set back of the cavity moves the center of sub-ambient pressure further back on the ABS 402 which increases pitch and reduces the sub-ambient pressure under the ABS 402 during unloading. This rearward positioning of the cavity is, however, limited by desired flight profile characteristics. The amount of cavity set back can be increased with increasing disk speed without sacrificing performance. In some cases the set back can be as great as 25%.

In addition the sub-ambient pressure can be controlled, however, by adjusting the width W of the channel 410. A widening of the channel will reduce the sub-ambient pressure, whereas narrowing the channel will increase the sub-ambient pressure created by the cavity 412. As the read/write head 400 moves from the outer diameter to the inner diameter of the disk during operation, the speed of airflow generated under the ABS 402 will decrease in direct proportion. An optimum balance of sub ambient and high pressure is obtained when there is negligible difference in fly height between the inner and outer diameters of the disk.

The channel width can vary from 3 mil to 15 mil as necessitated by design parameters such as the speed of the disk 16 on which the ABS 402 is to be used. However, it has been found that a channel width W of 8 mils on a 40 mil wide read/write head 400 provides an optimum sub-ambient pressure in the cavity 412 for most applications and disk drive speeds. The floor of the channel 410 and cavity 412 are both at the level of the base elevation 404.

With continued reference to FIG. 4, the configuration of the channel and cavity prevent accumulation of debris on the ABS 402. Prior art read/write heads have experienced the drawback that the sub-ambient pressure created by a cavity will tend to pick up debris which accumulates on the ABS, affecting the configuration of the ABS surface and therefore the fly height characteristics of the air bearing. The present invention solves this problem by creating a flow of air through the channel 410. The air flowing through the channel will travel across the swept back edge of the cavity as it flows toward the trailing edge. This flow of air flushes debris from the ABS and prevents accumulation.

With further reference to FIG. 4, each of the side rails 406 is provided with a front pad 414, located toward the front end of the side rail. The front pads 414 create a high pressure area thereunder which tends to lift the read/write head 400. In addition, the location of the front pads controls the pitch of the head 400. Locating the front pads closer to the front end of the rail will decrease pitch, whereas moving them further back will increase pitch.

Disposed midway along the length of each side rail is a central pad 416. The central pads extend along a portion of the inner edge of each side rail 416 at the boundary of the cavity 412. The central pads create further positive pressure for lifting the read/write head 400 and have a curved, swept back shape which increases performance when the read/write head is at a skewed angle.

With further reference to FIG. 4, beyond the central pads 416, the side rails extend further toward the back end of the ABS 402 to form trailing portions 418. The trailing portions extend along the lateral edges of the ABS 402 and terminate near the back or trailing edge 405 of the ABS 402.

The trailing portions 418 of the side rails 406 terminate in rear pads 420, one on each side rail. The trailing portions 418 and rear pads 420 act to stabilize roll and help optimize the flight profile of the ABS during use. It is believed that separating the central pads from the rear pads along the trailing edge portion allows air to bleed through the separation, which provides a uniform pitch at varying speeds and skew angles experienced between the outer and inner diameter of the disk. An ABS not having rear pads will exhibit an excessive pitch, of 200 to 300 microradians. The rear pads have a generally oval shape and are smaller than the front pads 414 or central pads 416.

While it will be appreciated by those skilled in the art that the present invention can be practiced on ABSs of various dimensions, in the preferred embodiment of the invention the front and central pads 414 and 416 respectively (FIG. 4) extend 30 to 120 micro inches from the base elevation 404 and 3 to 12 micro inches from the tops of the rails 406. Similarly, the rear pads 420 extend 30 to 120 micro inches from the base elevation 404 and 3 to 12 micro inches from the elevation of the gap 418.

Figure 5:
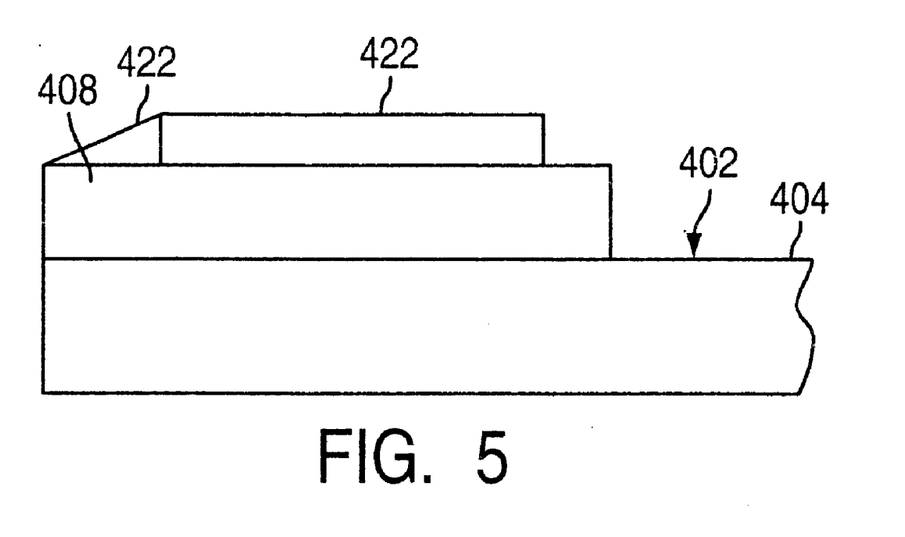
FIG. 5 is a partial side view taken along line 5—5 of FIG. 4.
Figure 6:
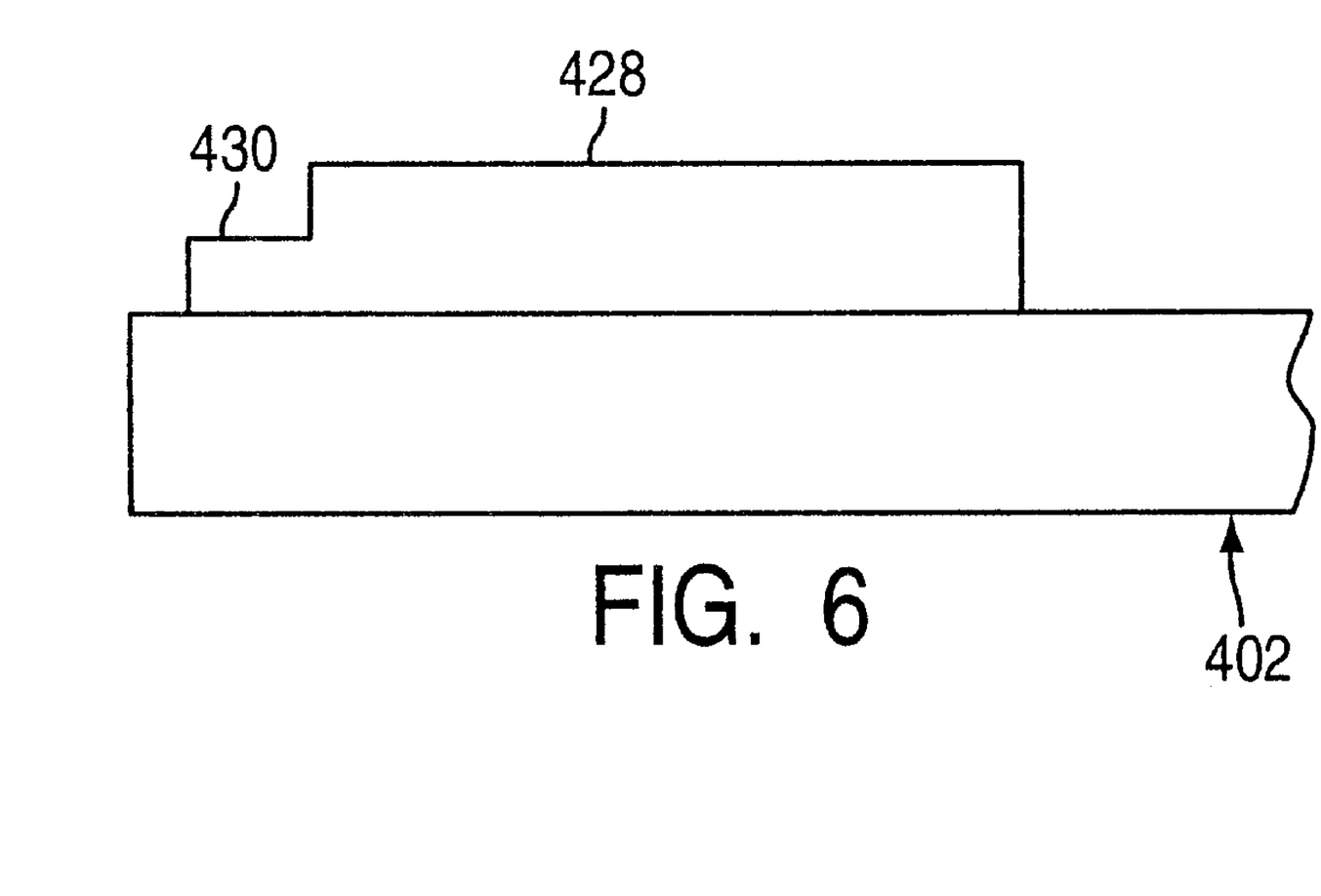
FIG. 6 is a partial side view similar to FIG. 5 of an alternate embodiment of the invention.

Centrally located between the lateral sides of the ABS adjacent to the trailing edge 405 is the trailing edge pad 408. The trailing edge pad of the preferred embodiment includes a raised step 422, defining thereabout on three sides a shallow area 424. A profile of the step is shown with reference to FIG. 5. The step 422 extends 30 to 120 micro inches from the base elevation 404 and 3 to 12 micro inches from the top of the trailing edge pad 408. In the preferred embodiment the step 422 is formed with a ramped trailing edge 426 which slopes gradually to the trailing edge pad 408. The trailing edge pad 408 and step 422 create a high pressure area thereunder, acting to lift the read/write head 400 during operation of the disk drive. The pressure under and directly in front of the step is higher than at any other point of the ABS, and accounts for the majority of the lift. The tailing edge pad 408, and step 422, improve the fly height profile and are critical to proper operation of the air bearing over a high range of skew angles. An alternate embodiment of the step which does not have a tapered trailing edge portion is referred to as 428 in FIG. 6. In this embodiment the step is provided with a notched trailing edge 430 which acts to increase the pitch of the read/write head 400 slightly by creating a slight sub-ambient pressure at the trailing edge.

Figure 7:
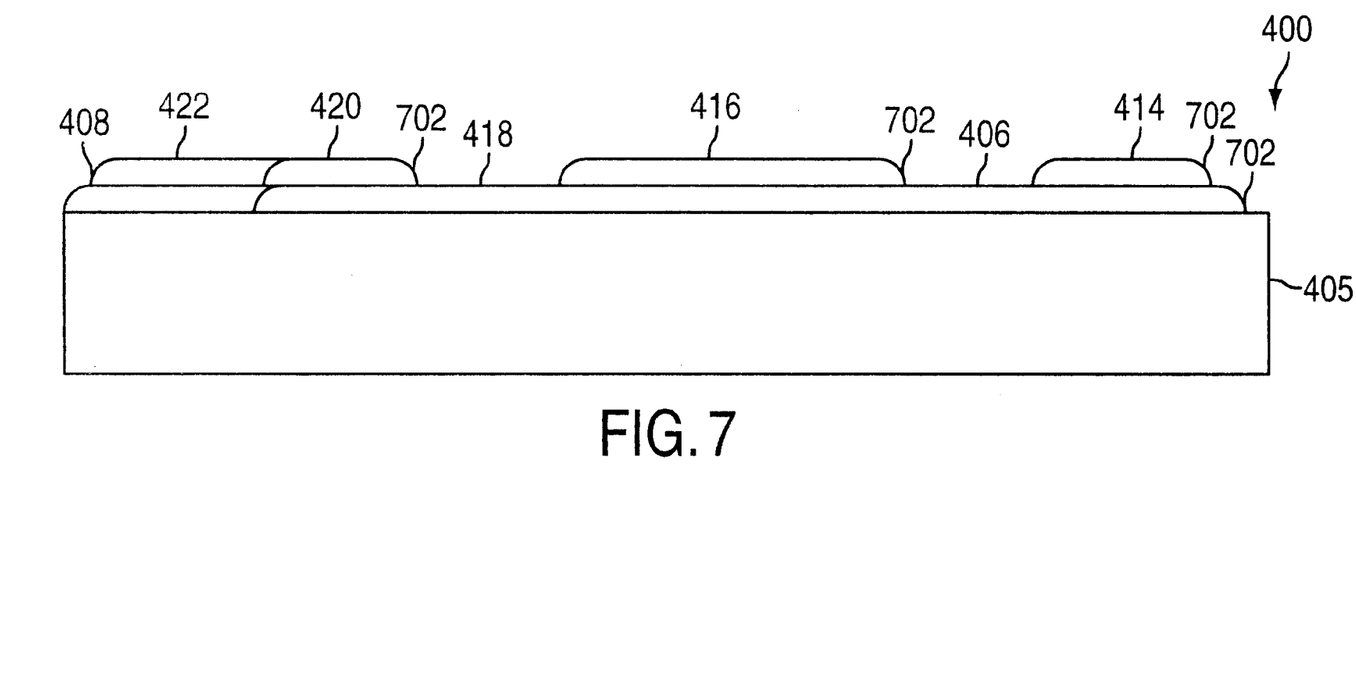
FIG. 7 is a side view taken along line 7—7 of FIG. 4.

With reference to FIG. 7, which shows a profile of the ABS 402, the transitions 702 between the base elevation 404 and the rails 406 and between the base elevation 404 and the step 408 are in the form of smooth ramps having a nominal slope of 10 degrees from vertical. The same is true of the transitions 702 from the rails 406 and the pads 414 and 416 as well as the pad 408 and step 422. These smooth transitions 702 promote the controlled high pressures necessary for flying the ABS 402 and facilitate manufacture.

Figure 10A:
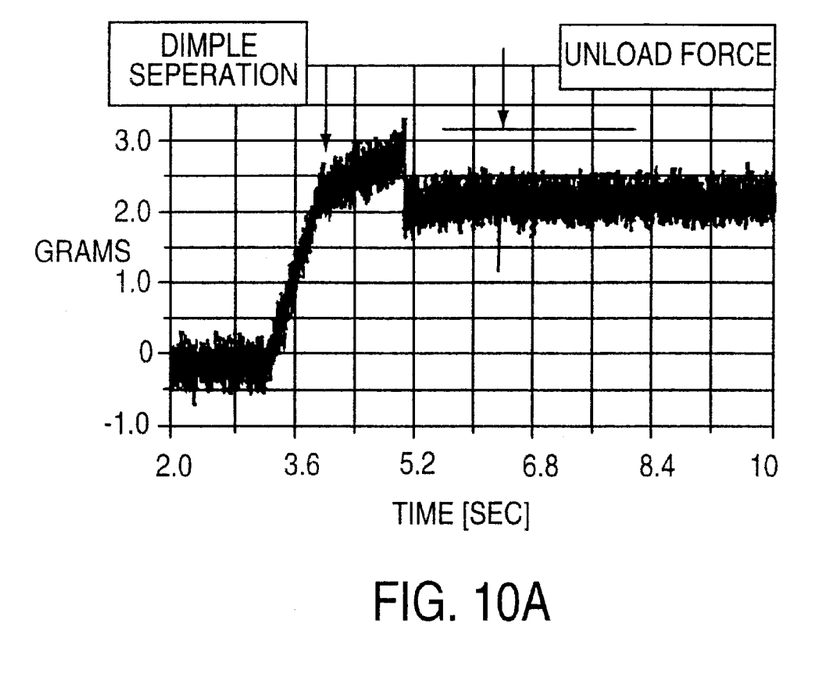
FIG. 10A is a graph illustrating the unload characteristics of a prior art air bearing.
Figure 10B:
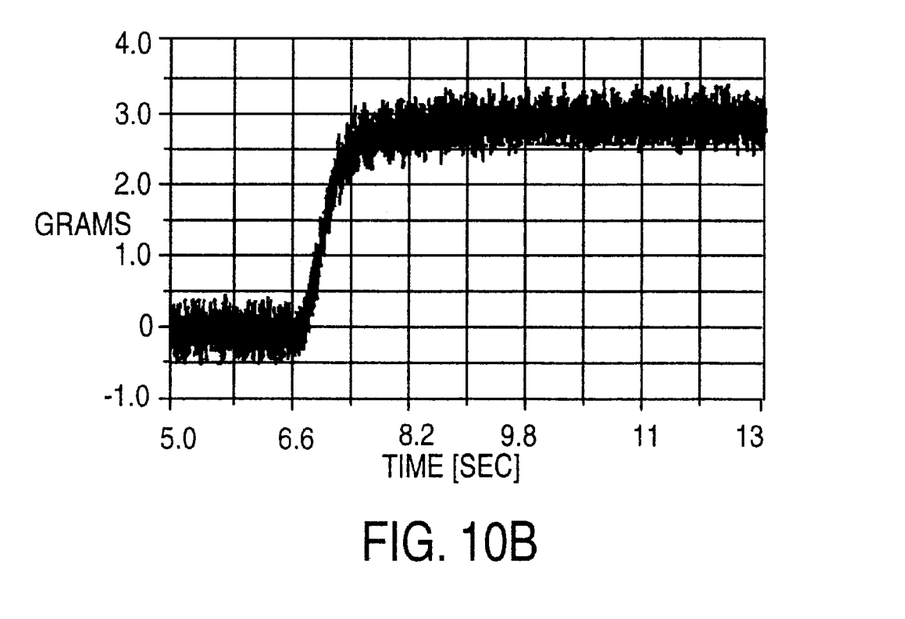
FIG. 10B is a graph illustrating exemplary unload characteristics of an air bearing of the present invention.

With reference to FIG. 10, the performance improvement provided by the present invention can be appreciated. FIG. 10A illustrates the unload characteristics of an air bearing of the prior art. FIG. 10B, on the other hand, illustrates the improved unload performance of the air bearing of the present invention. FIGS. 10A and 10B show that the measured load normal to the surface of the recording medium increases as the air bearing is unloaded. This load reaches a steady state at approximately 2.5 grams which corresponds to the static load applied by the suspension.

However, FIG. 10A illustrates a spike in the unload characteristics of the prior art air bearing followed by an abrupt drop. This spike corresponds to the start of dimple separation. The sub ambient force holds the slider down while the suspension keeps going up the ramp. Finally, the sub ambient force is reduced to zero, which results in a large drop in measured load. This change in load is called the unload or lift-off force. When minimized, it can drastically reduce damage to the suspension arm, as well as reduce the possibility of head-disk contact. With reference to FIG. 10B it can be appreciated that the unload history of the present invention is advantageously very smooth, with no apparent sign of dimple separation.

Figure 8:
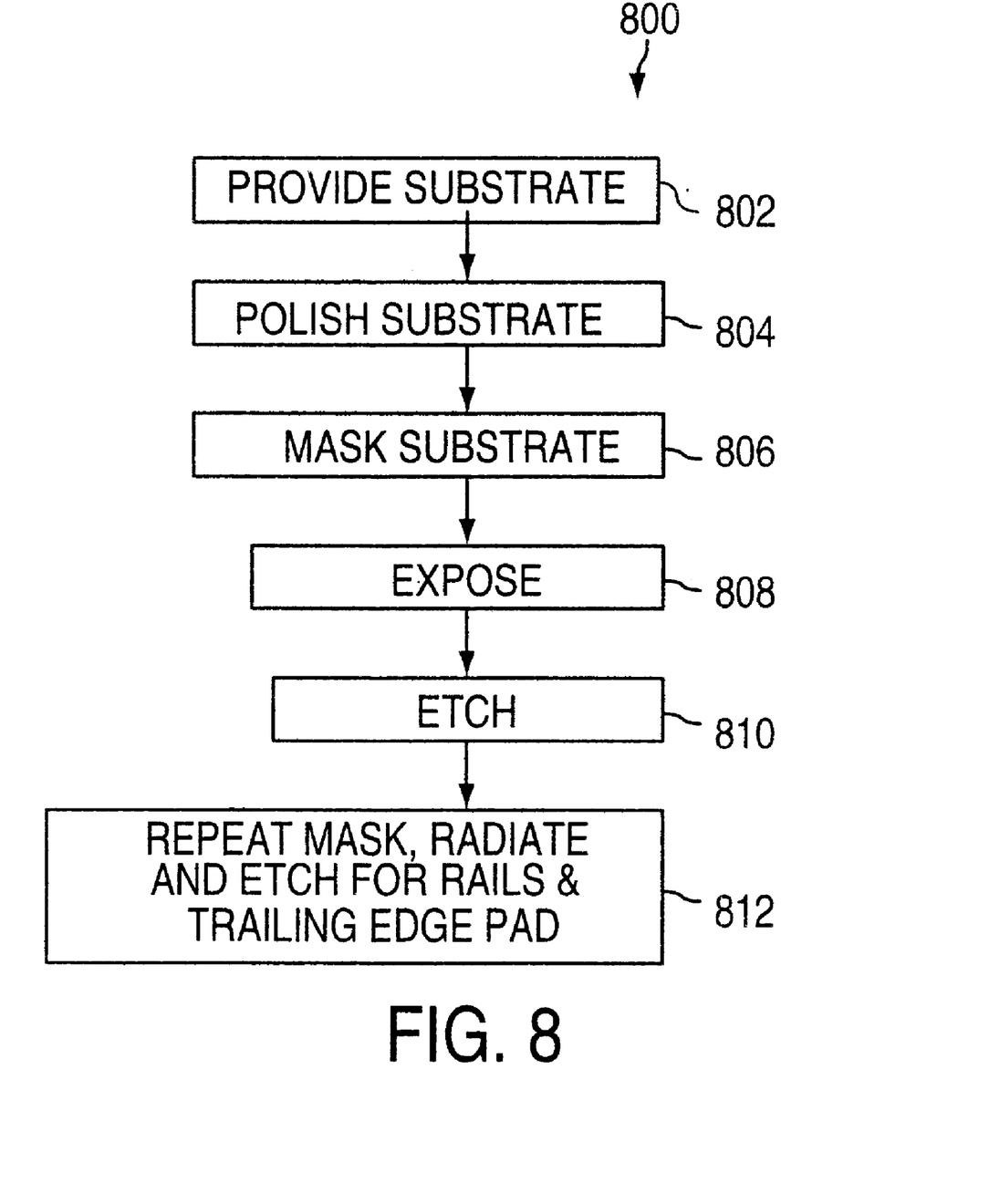
FIG. 8 is a schematic of a process including step for manufacturing the present invention.

With reference to FIG. 8, a process 800 for manufacturing the ABS 402 of the present invention begins with providing a ceramic substrate in a step 802. By way of example, the ceramic substrate can be constructed of $Al_2TiC_3$, and is polished in a step 804 to provide a smooth flat surface. The polished substrate can then masked in a step 806 as part of a reverse lithography process. The masked substrate can then be exposed, in a step 808, which causes the exposed portions to harden, prior to etching in a step 810. During the etching process, the portions of the ABS 402 which have not been exposed to the radiation will be removed at a faster rate than the exposed portions, thereby creating the desired shape. It will be appreciated by those skilled in the art that the first etching process will produce the pads 414, 416 and 420 as well as the step 422. A second photolithography step 812 will be necessary to create the rails 406 and trailing edge pad 408.

Figure 9:
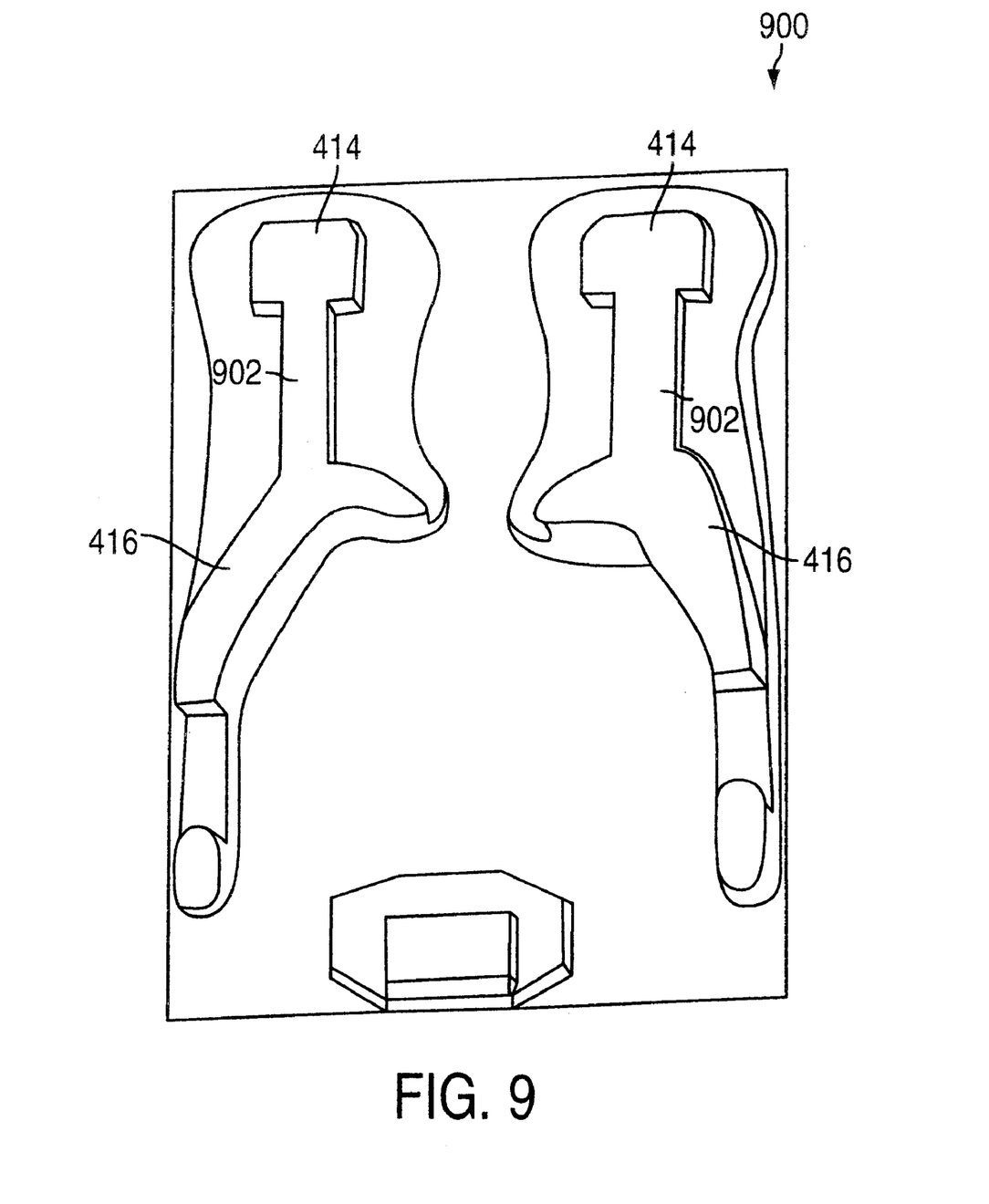
FIG. 9 is a perspective view, similar to FIG. 4, of an alternate embodiment of an air bearing.

With reference to FIG. 9, in an alternative embodiment 900 of the invention, the central pads 416 and front pads 414 are connected by a bridge 902. This embodiment affects the flight profile by increasing the pitch.

In summary, the present invention provides an ABS which promotes load and unload by reducing the sub ambient pressure during unloading of the read/write head. The ABS also exhibits a stable flight profile over a wide range of disk speeds and skews. While the invention has been described in terms of several preferred embodiments, other embodiments of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modification, permutations and equivalents as fall within the true spirit and scope of the present invention.

What is claimed is:

1. A read/write head comprising:
    a proximal end and a distal end and a pair of lateral sides; and
    an air bearing surface formed of
        a base surface;
        first and second lateral rails each extending above the base surface from near the proximal end to near the distal end, the lateral rails being isolated from each other by a cavity and a channel, the channel opening into the cavity about midway along a length of the lateral rails, each lateral rail including
            a trailing portion and a leading portion that meet about midway along the length, the cavity being formed between the two trailing portions and the channel being formed between the two leading portions, the trailing portions being narrow relative to the leading portions,
            a leading edge pad formed near the proximal end,
            a center pad formed about midway along the length; and
        a trailing edge rail extending above the base surface and disposed between the lateral sides near the distal end.

2. The read/write head of claim 1 wherein the channel includes a channel length defined by a length of the leading portions, and further includes a channel width defined by the horizontal distance between the leading portions.

3. The read/write head of claim 2 wherein the channel width is substantially constant as a function of channel length.

4. The read/write head of claim 3 wherein the channel width is 8 mil.

5. The read/write head of claim 2 wherein the channel width is variable as a function of channel length.

6. The read/write head of claim 5 wherein the channel width is between 3 mil and 15 mil.

7. The read/write head of claim 5 wherein the channel width varies as a function of channel length such that the channel width narrows at both channel ends.

8. The read/write head of claim 1 wherein each leading edge pad extends 30 to 120 micro inches from the base surface.

9. The read/write head of claim 8 wherein each leading edge pad also extends 3 to 12 micro inches from a top surface of a first or second rail.

10. The read/write head of claim 1 wherein each center pad has a curved and swept back shape.

11. The read/write head of claim 10 wherein each center pad extends 30 to 120 micro inches from the base surface.

12. The read/write head of claim 11 wherein each center pad also extends 3 to 12 micro inches from a top surface of a first or second rail.

13. The read/write head of claim 1 wherein the trailing portions of the first and second lateral rails each include a rear pad formed near the distal end.

14. The read/write head of claim 13 wherein the rear pads are generally oval shaped.

15. The read/write head of claim 14 wherein the rear pads are smaller than the front pads.

16. The read/write head of claim 13 wherein each rear pad extends 30 to 120 micro inches from the base surface.

17. The read/write head of claim 16 wherein each rear pad also extends 3 to 12 micro inches from a top surface of a first or second rail.

18. The read/write head of claim 1 wherein the leading portions of the first and second lateral rails each include a bridge pad connecting the leading edge pad and the center pad.

19. The read/write head of claim 1 wherein the trailing edge rail further includes a trailing edge pad formed thereon.

20. The read/write head of claim 19 wherein the trailing edge pad includes a ramped trailing edge.

21. The read/write head of claim 20 wherein the ramped trailing edge slopes gradually to the trailing edge rail.

22. The read/write head of claim 19 wherein the trailing edge pad extends 30 to 120 micro inches from the base surface.

23. The read/write head of claim 22 wherein the trailing edge pad also extends 3 to 12 micro inches from a top surface of the trailing edge rail.

24. The read/write head of claim 1 wherein each rail further includes a first sidewall extending between the base surface and top surfaces thereof.

25. The read/write head of claim 24 wherein the first sidewall is a smooth ramp with a nominal slope of 10° from vertical.

26. The read/write head of claim 24 wherein each pad further includes a second sidewall extending between a top surface thereof and top surfaces of each rail.

27. The read/write head of claim 26 wherein the second sidewall is a smooth ramp with a nominal slope of 10° from vertical.

28. A read/write head comprising:
    a proximal end and a distal end and a pair of lateral sides;
    a base surface;
    first and second lateral rails each extending above the base surface from near the proximal end to near the distal end, the lateral rails being isolated from each other by a cavity and a channel, the channel opening into the cavity about midway along a length of the lateral rails, each lateral rail including a trailing portion and a leading portion that meet about midway along the length, the cavity being formed between the two trailing portions and the channel being formed between the two leading portions, the trailing portions being narrow relative to the leading portions, a leading edge pad formed near the proximal end, a center pad formed about midway along the length; and a trailing edge rail extending above the base surface and disposed between the lateral sides near the distal end;

whereby exposed portions of the base surface, the first and second lateral rails, and the trailing edge rail together form an air bearing surface.

29. A read/write head comprising:

a slider body including a generally planar base surface defining a base plane and having a leading edge and an opposing trailing edge;

a pair of side rails protruding separately from the base plane, each of the rails including         a leading portion, having a leading portion width, extending to near the leading edge, and having a front pad protruding therefrom,         a trailing portion, having a trailing portion width less than the leading portion width, extending to near the trailing edge, and having a rear pad protruding therefrom, and         a central pad protruding from the rail and disposed between the front pad and the rear pad,         the leading portions defining between them a channel, and the trailing portions defining between them a cavity; and a trailing edge rail protruding from the base plane between the trailing portions near the trailing edge;

the base surface, the rails and the pads forming an air bearing surface.

30. A read/write head comprising:

a slider body including a generally planar base surface defining a base plane and having a leading edge and an opposing trailing edge;

a pair of side rails protruding separately from the base plane, each of the rails including         a leading portion, having a leading portion width, extending to near the leading edge, and         a trailing portion, having a trailing portion width less than the leading portion width, extending to near the trailing edge,     the trailing portions defining between them a cavity, and     the leading portions defining between them a channel with         a leading end near the leading edge,         a cavity end near the cavity,         a center disposed between the leading and cavity ends, and         a variable width measured at the base plane that is less at the cavity end than at the leading end and greater at the center than at either end;

a trailing edge rail protruding from the base plane between the trailing portions near the trailing edge; and the base surface and the rails forming an air bearing surface.

* * * * *